Figure 1:
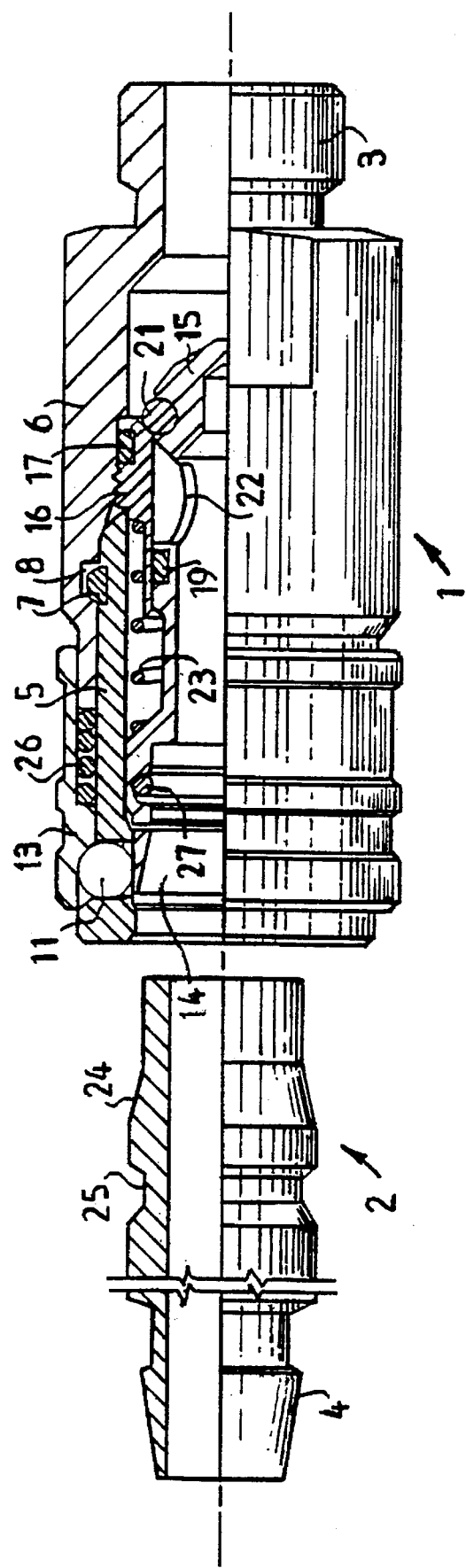

United States Patent [19]
Kjellberg

[11] Patent Number: 5,607,139
[45] Date of Patent: Mar. 4, 1997

[54] COUPLING FOR COUPLING TOGETHER HOSES OR PIPES FOR A PRESSURE MEDIUM

[75] Inventor: Kenneth Kjellberg, Skövde, Sweden

[73] Assignee: Nyberg, Bo Erik, Oberageri, Switzerland

[21] Appl. No.: 446,643

[22] PCT Filed: Nov. 26, 1993

[86] PCT No.: PCT/SE93/01024

§ 371 Date: Jul. 21, 1995

§ 102(e) Date: Jul. 21, 1995

[87] PCT Pub. No.: WO94/12826

PCT Pub. Date: Jun. 9, 1994

[30] Foreign Application Priority Data

Nov. 27, 1992 [JP] Japan ..................... 4-318559

[51] Int. Cl.⁶ .................................. F16L 37/28
[52] U.S. Cl. ................... 251/149.6; 251/149.1; 285/316
[58] Field of Search .............. 251/149.6, 149.1; 285/316

[56] References Cited

U.S. PATENT DOCUMENTS

| 3,052,261 | 9/1962 | Nyberg | 251/149.6 |
| 4,613,112 | 9/1986 | Phlipot et al. | 251/149.6 |
| 5,290,009 | 3/1994 | Heilmann | 251/149.6 |

*Primary Examiner*—A. Michael Chambers
*Attorney, Agent, or Firm*—Morgan & Finnegan, LLP

[57] ABSTRACT

A coupling for coupling together hoses or pipes for a pressure medium is described. The coupling has a coupling sleeve and a nipple insertable in the sleeve. The coupling sleeve has a valve device for opening the flow-through of the pressure medium as the nipple is inserted to its engagement position and consists of a sleeve-shaped front part and a sleeve shaped rear part. The front part is rotatable but axially essentially non-displaceable and joined to the rear part by means of a resilient lock ring. The valve device also has a valve body in the form of a sleeve, a valve seat for cooperation with the valve body and a blocking sleeve for cooperation with the nipple upon insertion thereof.

8 Claims, 2 Drawing Sheets

COUPLING FOR COUPLING TOGETHER HOSES OR PIPES FOR A PRESSURE MEDIUM

The invention relates to a coupling for coupling together a hose or a pipe with another hose or pipe for a pressure medium, said coupling comprising a coupling sleeve and a nipple insertable therein, said coupling sleeve and the nipple being provided with individual connecting means for a hose or a pipe, said coupling sleeve comprising a valve device which is disposed to open for pressure medium flow when the nipple is inserted to an engagement position, said coupling sleeve comprising a sleeve-shaped front part and a sleeve-shaped rear part joined thereto, said rear part being provided with a releasable ball lock for blocking the nipple in the engagement position, on which rear part the connecting means is arranged.

Couplings of this type are known in different designs and are used primarily for gases, such as compressed air, but can also be used for liquids. The nipple is locked in the engaged position in the coupling sleeve by means of the ball locks which normally permit a certain amount of rotation of the nipple relative to the coupling sleeve. This rotatability can, however, be appreciably reduced by dirt penetrating into the ball locks, which can eventually result in the resistance to rotation becoming so great that rotation can only be performed with great difficulty. The result of this can be that a tool coupled by means of a hose to the coupling cannot be used in the desired manner if rotation of the hose is required, without making handling of the tool exceptionally difficult due to twisting of the hose.

In couplings of this type it is also necessary to see that the valve device and the front part have such strength that there is no risk that one of the components will break if the nipple is subjected to bending forces, e.g. as a result of a powerful bending of this hose or as a result of direct mechanical impact, e.g. if the coupling falls against a hard surface. At the same time one should of course keep the material dimensions as small as possible so as to provide sufficient flow-through area for the pressure medium through the coupling.

The invention is intended to achieve a coupling of the type described by way of introduction which assures easy rotatability even if the ball lock should be more or less blocked as a result of dirt penetrating therein. It should also provide good strength in the component parts at the same time as they can be made with relatively small dimensions without restricting the flow-through area. This is achieved according to the invention with a coupling which is characterized by the novel features disclosed in the claims.

Figure 2:
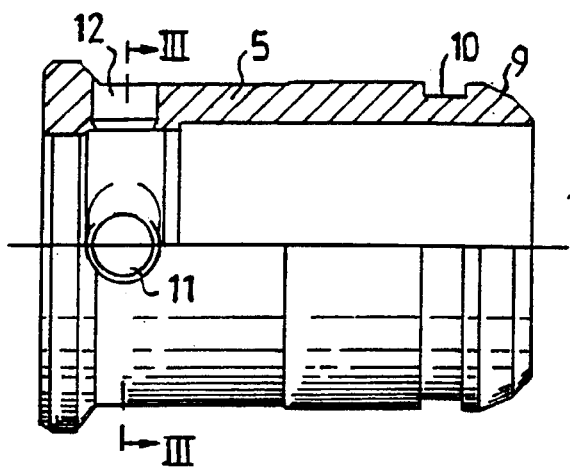
Figure 3:
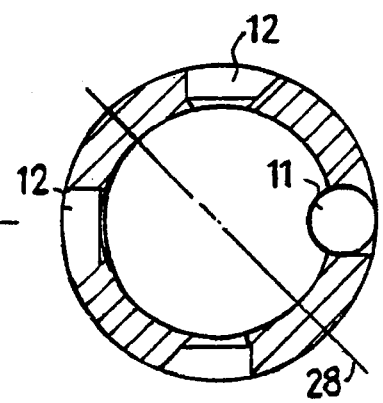
Figure 4:
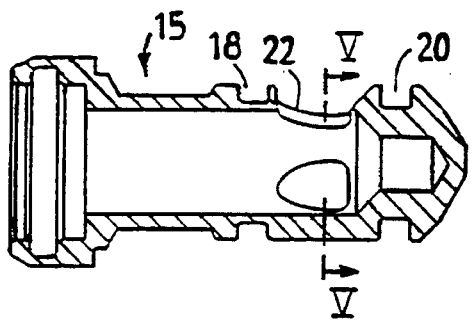
Figure 5:
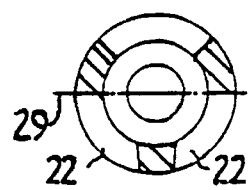
Figure 6:
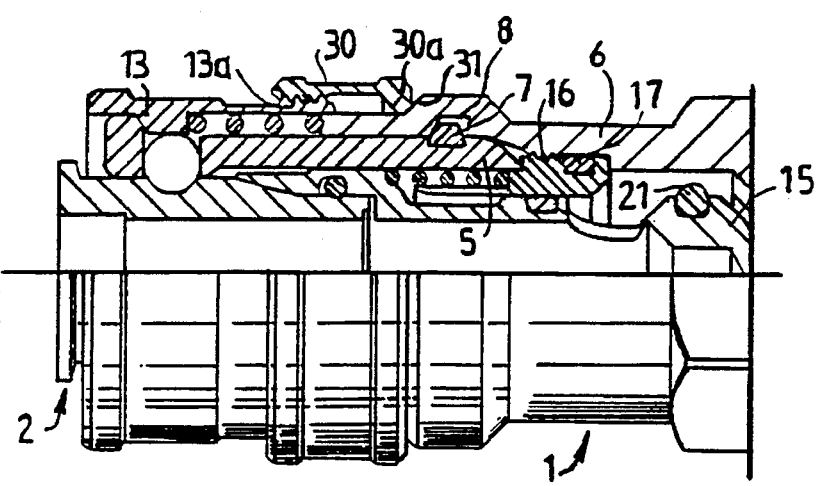

The invention will be described in more detail below with reference to the accompanying drawings which show suitable embodiments of the coupling according to the invention and in which:

FIG. 1 is a partially cut-away sideview of a coupling according to the invention, FIG. 2 is a partially cut-away sideview of the front part of the coupling according to FIG. 1, FIG. 3 shows a section along the line III—III in FIG. 2, FIG. 4 shows a central longitudinal section through the valve body in the coupling according to FIG. 1, FIG. 5 shows a section along the line V—V in FIG. 4, and FIG. 6 is a partial cut-away sideview of a modified embodiment of the coupling according to the invention in its coupled state.

The coupling shown in FIG. 1 consists of a coupling sleeve 1 and a nipple 2 insertable therein. The coupling sleeve 1 is provided with connecting means 3 for a pipe, a conduit or a hose (not shown), and the nipple 2 is provided with a connecting means 4 for another conduit pipe or conduit hose (not shown).

The coupling sleeve 1 is composed of a sleeve-shaped front part 5 and a sleeve-shaped rear part 6 joined thereto. As can be seen in FIG. 1, the front part 5 is inserted into the rear part 6 and fits relatively well therein. Between the front part 5 and the rear part 6 there is a lock ring 7 which locks the two parts axially relative to each other but permits easy rotation of the front part 5 in the rear part 6. The lock ring 7 is placed in an internal annular groove 8 in the rear part 6. The annular groove 8 has a depth which at least corresponds to the thickness of the lock ring 7. When inserting the front part 5 into the rear part 6, the lock ring 7 will be expanded by the conical end 9 (FIG. 2) of the front part 5 until the ring is disposed in an external annular groove 10 on the front part 5. The front part 5 is thereafter axially blocked relative to the rear part 6.

The front part 5 is provided with a ball lock with balls 11 arranged in holes 12 in the front part 5. The balls 11 are shown in FIG. 1 in their disengaged position in which they are locked with an external lock sleeve 13 in an internal blocking sleeve 14.

The coupling sleeve 1 is also provided with a valve device, which is shown in FIG. 1 in the closed position. The valve device consists of the blocking sleeve 14, a valve body 15 and a valve seat 16. The valve seat 16 is solidly mounted between the front part 5 and the rear part 6 and is provided with external sealing means 17 for sealing relative to the rear part 6. The valve body 15 is essentially sleeve-shaped and is closed at its inner end.

Around its lateral surface which fits exactly against the inside of the valve seat 16, the valve body 15 is provided with a groove 18 for a sealing ring 19. The valve body 15 also has an annular groove 20 near its closed end. The annular groove 20 holds a sealing means 21 for sealing against the end of the valve seat 16. Between the sealing ring 19 and the sealing means 21, the valve body 15 has a number of openings 22, which function as flow-through openings for pressure medium when the nipple 2 is inserted into the coupling sleeve 1, as will be described below. The valve body 15 is kept in a closed closed position with the sealing means 21 in contact with the valve seat 16 by means of a spring 23.

When a nipple 2 is inserted into the coupling sleeve I, the end of the nipple 2 will push in the valve body 15, so that the sealing ring 21 leaves the valve seat 16 and opens a passage for flow of pressure medium from the connection 3 to the rear pan 6, the flow-through openings 22, the valve body 15 and the nipple 2 to the connecting means 4. The nipple 2 with its conical surface 24 will push the blocking sleeve 14, thus freeing the balls 11 so than they can penetrate into a ball groove 25 in the nipple 2. When the balls 11 have penetrated into the ball groove 25, the lock sleeve 13 will be displaced axially under the influence of a spring 26 so that the lock sleeve 13 locks the balls 11 in the ball groove 25. This means that the nipple 2 will be locked in its engagement position in the coupling sleeve 1, or more specifically in its front part 5. A seal between the nipple 2 and the valve body 15 is achieved by means of a sealing ring 27.

FIG. 6 shows a modified embodiment of the coupling according no the invention. It has been found that in certain cases an unintentional decoupling of the coupling sleeve 1 from the nipple 2 can occur, namely if the lock sleeve 13 sticks on an edge or the like and the user pulls the hose which is connected to the nipple 2. In order to avoid this, the lock sleeve 13, in the embodiment shown in FIG. 6, is provided with an externally threaded portion 13a onto which there is screwed a blocking means 30 in the form of an internally threaded ring. The blocking means 30 extends past the end of the lock sleeve 13 and is provided with a thicker portion 30a, which is intended to interact with an external shoulder 31 on the rear pan 6.

FIG. 6 shows the blocking means 30 in its blocking position, where the thicker portion 30a abuts against the shoulder 31. This means that the lock sleeve 13 cannot be moved towards the rear part 5 to make it possible to decouple the coupling sleeve 1 and the nipple 2. To make decoupling possible, the blocking means 30 must be screwed forwards on the lock sleeve 13, so that a free space is formed between the thicker portion 30a and the shoulder 31. Only thereafter can the lock sleeve 13 be displaced to release the balls 11 in the ball blocking mechanism.

The sealing ring 19 prevents, together with the sealing means 17, that pressure medium enters the space between the front part 5 and the valve body 15 when the valve body 15 is pushed in by the end of the nipple 2. This reduces the area of the valve body 15, on which the medium pressure acts, so that the force required for inserting the nipple 2 and pushing in the valve body 15 is less than what would otherwise be required.

According to the invention, the front part 5 is made of a plastics material, so that this part can be manufactured cheaply and easily. The ball holes 12 are made asymmetrical as can be seen in FIG. 3. The reason for this is to make it possible to manufacture the front part 5 in a relatively simple mould. If the dividing plane of the mould is disposed along the line 28 in FIG. 3, the holes 12 can be made with the aid of cores which can be drawn out perpendicular to the dividing plane.

The valve body 15 is also according to the invention made of a plastics material, and in this case as well, the manufacture is facilitated by the openings 22 being made in the manner shown in FIG. 5. This means that the cores for manufacturing the openings 22 can be drawn out perpendicular to the dividing plane, which is marked by the line 29 in FIG. 5.

By virtue of the fact that the front part 5 is made of a plastics material, the manufacture will be both simpler and less expensive. A further improvement is obtained by virtue of the fact that the valve body 15 is also manufactured of a plastics material. In order to improve the strength of the outer end of the coupling sleeve 1, especially against external forces, i.e. breaking forces and/or impact against the nipple 2, the blocking sleeve 14 is made of metal, e.g. brass or the like.

The invention is not limited to the embodiment described above. Rather changes can be made within the scope of the following patent claims.

I claim:

1. Coupling for coupling together a conduit with another conduit for a pressure medium, said coupling comprising a coupling sleeve and a nipple insertable therein to an engagement position, said coupling sleeve and the nipple being provided with individual connection means for a conduit, said coupling sleeve having a valve device which is disposed to open for pressure medium flow when the nipple is inserted to the engagement position, said coupling sleeve having a sleeve-shaped front part having an external annular groove formed thereon and a sleeve-shaped rear part joined thereto, said rear part having an internal annular groove formed therein and being provided with a plurality of releasable ball locks for blocking the nipple in the engagement position, on which rear part the connecting means is engaged, the front part is inserted into the rear part and is rotatable but axially essentially immobile when joined in the rear part by means of a resilient annular lock ring disposed in the internal annular groove in the inside of the rear part and which, upon axial insertion of the front part into the rear part is moved into the external annular groove in the outside of the front part, and that the valve device has an axially movable valve body in the form of a sleeve which is closed at one end and which is provided with at least one flow-through opening, a valve seat for cooperation with the valve body for closing off the pressure medium through-flow, and a blocking sleeve cooperating with the nipple to engage and disengage the plurality of releasable ball locks upon insertion and withdrawal thereof, and also upon insertion thereof for transmitting axial movements of the nipple to the valve body to release the valve body from the valve seat.

2. Coupling according to claim 1 wherein the front part and, selectively, the valve body is of a plastics material and that the blocking sleeve is of a metal.

3. Coupling according to claim 1, wherein a sealing means is interposed between the outside of the valve body and the inside of a cylindrical portion of the valve seat.

4. Coupling according to claim 1, wherein the valve seat is mounted between the front part and the rear part and has a sealing means for sealing between the valve seat and the rear part.

5. Coupling according to claim 1, wherein the blocking sleeve has a conical internal surface and the nipple has a conical external surface for engagement with the blocking sleeve conical internal surface.

6. Coupling according to claim 1, wherein the rear part has a shoulder, the lock sleeve has an external thread, a blocking means for engaging the external thread and is displaced between a blocking position, in which it blocks with the shoulder on the rear part, the lock sleeve against movement for release of the plurality of ball locks, and a release position in which the blocking means permits movement of the lock sleeve to release the plurality of ball locks.

7. A coupling according to claim 1, wherein said front part has a plurality of ball holes formed therein, said ball holes being asymmetrically formed in the front part.

8. A coupling according to claim 1, wherein said valve body has at least two flow-through openings being asymmetrically formed in said valve body.

* * * * *